United States Patent [19]

Kishida et al.

[11] Patent Number: 5,132,362

[45] Date of Patent: Jul. 21, 1992

[54] THERMOPLASTIC RESIN COMPOSITION

[75] Inventors: Kazuo Kishida, Tokyo; Kohji Matsumoto; Masaaki Mohri, both of Otake, all of Japan

[73] Assignee: Mitsubishi Rayon Company Ltd., Tokyo, Japan

[21] Appl. No.: 500,462

[22] Filed: Mar. 28, 1990

[30] Foreign Application Priority Data

Mar. 28, 1989 [JP] Japan .................. 1-75763

[51] Int. Cl.$^5$ .............................. C08G 63/48
[52] U.S. Cl. ........................... 525/67; 525/64
[58] Field of Search ........................ 525/67, 64

[56] References Cited

U.S. PATENT DOCUMENTS

| | | | |
|---|---|---|---|
| 4,280,948 | 7/1981 | Dieck ................... | 525/64 |
| 4,826,918 | 5/1989 | Kress ................... | 525/67 |
| 4,833,203 | 5/1990 | Endo et al. ........... | 525/67 |
| 4,868,235 | 9/1989 | Muehlbach et al. ... | 525/67 |
| 4,883,835 | 11/1989 | Buysch et al. ......... | 525/67 |
| 4,912,161 | 3/1990 | Eichenauer et al. ... | 525/67 |
| 4,937,285 | 6/1990 | Wittmann et al. ..... | 525/64 |
| 4,962,148 | 10/1990 | Orikasa et al. ....... | 525/64 |

*Primary Examiner*—Melvyn I. Marquis
*Attorney, Agent, or Firm*—Oblon, Spivak, McClelland, Maier & Neustadt

[57] ABSTRACT

Disclosed is a thermoplastic resin composition of an enhanced impact strength comprising 100 parts by weight of a thermoplastic resin and 2 to 50 parts by weight of a graft copolymer (A) obtained by emulsion-graft-polymerizing a monomer mixture comprised of a major amount of an acrylic monomer and a minor amount of a monomer selected from aromatic vinyl monomers and vinyl cyanide monomers in the presence of 60 to 90% by weight (as solids), based on the weight of the graft copolymer (A), of a diene type rubber latex containing more than 50% by weight of a diene type rubber polymer having a weight average particle diameter of at least 0.3 μm.

7 Claims, No Drawings

THERMOPLASTIC RESIN COMPOSITION

BACKGROUND OF THE INVENTION

1. Field of the Invention

The present invention relates to a thermoplastic resin composition. More particularly, it relates to a thermoplastic resin composition having a high heat resistance and an excellent impact resistance. The thermoplastic resin composition of the present invention can be advantageously used for the production of automobile parts such as interior parts, for example, a meter hood, a meter cluster, an instrument panel and a console box, exterior parts, for example, a bumper, an outer plate material and a lamp housing, and various machine parts.

2. Description of the Related Art

A polyester resin such as polyethylene terephthalate or polytetramethylene terephthalate is now often used as an engineering plastic for articles to be used at high temperatures, for example, an openable tray, an exterior part of a thermal implement and an electrical part, wherein the high melting point of the resin is utilized. Since the polyester resin has a poor strength and toughness, a method of incorporating a methyl methacrylate/butadiene/styrene copolymer (MBS resin) comprising a butadiene polymer as the rubber component into the polyester resin for improving the impact resistance has been proposed.

A polycarbonate resin has an excellent impact resistance, heat resistance, dimensional stability, and electrically insulating properties, and is widely used for the production of machine parts, protective safety tools, electrically insulating articles, optical machine parts, containers and the like.

The polycarbonate resin has a poor flowability and chemical resistance, and as the means for eliminating this defect, a polymer alloy formed by incorporating a saturated polyester resin such as polyethylene terephthalate or polytetramethylene terephthalate into the polycarbonate resin has now been proposed (Japanese Examined Patent Publication No. 36-14035, Japanese Examined Patent Publication No. 53-12537 and Japanese Examined Patent Publication No. 57-2744), and the application fields of this polymer alloy have been expanded. Nevertheless, if the saturated polyester resin is incorporated into the polycarbonate resin, the strength and toughness inherently possessed by the polycarbonate resin are lost, and therefore a method of improving the impact resistance by further incorporating an MBS resin has been proposed (Japanese Examined Patent Publication No. 55-9435).

As seen from the foregoing description, it is known that an MBS resin is incorporated in a thermoplastic resin such as a saturated polyester resin or a polycarbonate resin for improving the impact resistance, and it is known also that the MBS resin is incorporated in a vinyl chloride resin.

The improvement by incorporation of the MBS resin, however, does not result in a satisfactory increase of the impact resistance, and a further improvement is now desired.

SUMMARY OF THE INVENTION

Under this background, a primary object of the present invention is to provide a novel thermoplastic resin composition having an enhanced impact strength.

In accordance with the present invention, this problem can be solved by a thermoplastic resin composition comprising 100 parts by weight of a thermoplastic resin and 2 to 50 parts by weight of a graft copolymer (A) obtained by emulsion-graft-polymerizing a monomer mixture comprised of a major amount of an acrylic monomer and a minor amount of at least one monomer selected from the group consisting of aromatic vinyl monomers and vinyl cyanide monomers in the presence of 60 to 90% by weight (as solids), based on the weight of the graft copolymer (A), of a diene type rubber latex containing more than 50% by weight of a diene type rubber polymer having a weight average particle diameter of at least 0.3 μm.

The kind of the thermoplastic resin used in the present invention is not particularly critical and, for example, a vinyl chloride resin, a saturated polyester resin, a polycarbonate resin, a polyolefin resin, a methacrylic resin and a styrene resin can be mentioned. These thermoplastic resins can be used alone or in the form of a mixture of two or more thereof. Of these thermoplastic resins, a vinyl chloride resin, a polycarbonate resin, a saturated polyester resin and a mixture of a polycarbonate resin and a saturated polyester resin are especially preferably used.

Polyvinyl chloride and a vinyl chloride copolymer comprising at least 70% by weight of vinyl chloride units can be used as the vinyl chloride resin in the present invention. As the monomer to be copolymerized with vinyl chloride, ethylene, propylene, vinyl bromide, vinylidene chloride, vinyl acetate, an acrylic acid ester and a methacrylic acid ester can be used.

Polyethylene terephthalate and polytetramethylene terephthalate can be mentioned as the saturated polyester resin. A copolyester formed by copolymerization with a small amount of a diol such as 1,3-propanediol or a dicarboxylic acid such as isophthalic acid also can be used. These polyesters and copolyesters can be used alone or in the form of a mixture of two or more thereof.

A polycarbonate derived from 2,2'-(4,4'-dihydroxydiphenyl)propane is mainly used as the polycarbonate resin, but other bisphenol type polycarbonates also can be used.

Polyethylene and polypropylene can be used as the polyolefin resin.

Polymethyl methacrylate and a methyl methacrylate/alkyl acrylate copolymer formed by copolymerizing methyl methacrylate with a small amount of an alkyl acrylate can be mentioned as the methacrylic resin.

Polystyrene, high-impact polystyrene (HIPS), an acrylonitrile/styrene copolymer and a styrene/maleic anhydride copolymer can be mentioned as the styrene resin.

The diene type rubber polymer latex used for the preparation of the impact resistance improver in the thermoplastic resin composition of the present invention comprises more than 50% by weight (as solids) of a large-particle-size rubber latex (diene type rubber polymer) having a weight average particle diameter of at least 0 3 μm, and preferably, the diene type rubber polymer latex comprises at least 70% by weight (as solids), more preferably at least 75% by weight (as solids), of the large-particle-size rubber latex having a weight average particle diameter of at least 0.3 μm. If the weight average particle diameter of the rubber latex is not large, that is, the weight average particle diameter of the rubber latex is smaller than 0.3 μm, the impact resistance of the finally obtained resin composition is poor.

As the method of preparing this large-particle-size rubber latex, a method can be adopted in which a rubber latex having a desired particle size is formed by emulsion polymerization conducted at a low temperature for a long time, and a method in which an acid, an electrolyte or a polymer latex having carboxylic acid units is added to a small-particle-size prepared by the ordinary emulsion polymerization to agglomerate the rubber. The method in which a polymer latex having carboxylic acid units, for example, an alkyl acrylate/unsaturated acid copolymer latex, is added to a small-particle-size rubber latex prepared by the usual emulsion polymerization to agglomerate the rubber latex and obtain a large-particle-size rubber latex is especially preferably adopted.

The method in which a large-particle-size rubber latex is prepared at a low temperature over a period of a long time is disadvantageous in that the polymerization time is long and the cost increased. Where agglomeration is effected by addition of an acid or electrolyte, the preparation of rubber particles comprising more than 50% by weight of particles having a particle diameter of at least 0.3 μm becomes disadvantageous from the viewpoint of the stability of the emulsion system.

If the proportion of the large-particle-size rubber latex in the diene type rubber polymer latex is not larger than 50% by weight, the effect obtained by the use of the large-particle-size rubber latex is reduced, and only a resin composition having a low impact strength is obtained as where a rubber latex having a particle diameter smaller than 0.3 μm alone is used.

As the diene type polymer, there can be used a butadiene polymer, or a butadiene/styrene copolymer, butadiene/acrylonitrile copolymer or butadiene/butyl acrylate copolymer composed mainly of butadiene. Popularly, a butadiene polymer or a butadiene/styrene copolymer is used. The weight average particle diameter of the diene type rubber polymer latex is measured from an electron microscope photograph of the latex or measured by the light scattering method. The measurement methods are described in detail in "Chemistry of Polymer Latex" written by Soichi Muroi.

The graft copolymer (A) used in the present invention is obtained by emulsion-graft-polymerizing a monomer mixture comprised of a major amount of an acrylic monomer and a minor amount of at least one monomer selected from the group consisting of aromatic vinyl monomers and vinyl cyanide monomers in the presence of the above-mentioned diene type rubber polymer latex.

An alkyl methacrylate or acrylate monomer having 1 to 4 carbon atoms in the alkyl group is preferably used as the acrylic monomer. For example, there can be mentioned methyl methacrylate, ethyl methacrylate, propyl methacrylate, isopropyl methacrylate, n-butyl methacrylate, isobutyl methacrylate, tert-butyl methacrylate, methyl acrylate, ethyl acrylate, propyl acrylate and n-butyl acrylate. Methyl methacrylate is most preferable.

Styrene can be mentioned as a typical instance of the aromatic vinyl monomer used in the present invention. Furthermore, α-substituted styrenes, nucleus-substituted styrenes and derivatives thereof, such as α-methylstyrene, chlorostyrene and vinyltoluene, can be used.

Acrylonitrile and methacrylonitrile can be mentioned as the vinyl cyanide monomer, and acrylonitrile is especially preferably used.

In the emulsion graft polymerization, a major amount of the acrylic monomer is used and the minor amount of the aromatic vinyl monomer and/or the vinyl cyanide monomer is used. More specifically, the amount of the acrylic monomer is more than 50% by weight, preferably at least 65% by weight, based on the total amount of the monomers to be graft-polymerized, and the amount of the aromatic vinyl monomer and/or the vinyl cyanide monomer is less than 50% by weight, preferably up to 35% by weight, based on the total amount of the monomers to be graft-polymerized. If the acrylic monomer is used in a minor amount, the compatibility between the graft copolymer (A) and the thermoplastic resin is poor and the expected impact resistance cannot be manifested.

The amount of the diene type rubber polymer in the graft copolymer (A) is 60 to 90% by weight, preferably 70 to 90% by weight, as solids. If this amount is larger than 90% by weight, the mixing property of the final resin composition becomes very poor, and defects such as hard spots and fish eyes appear on the surface. In contrast, if the amount of the diene type rubber polymer is smaller than 60% by weight, the improvement of the impact resistance in the final resin composition is not satisfactory.

The graft copolymer (A) used in the present invention is preferably prepared according to the usual emulsion polymerization.

As the emulsifier, there can be used anionic surface active agents such as fatty acid salts, alkyl sulfate salts, alkyl benzenesulfonate salts, alkyl phosphate salts and dialkyl sulfosuccinate salts, non-ionic surface active agents such as polyoxyethylene alkyl ethers, polyoxyethylene fatty acid esters, sorbitol fatty acid esters and glycerol fatty acid esters, and cationic surface active agents such as alkylamine salts. These surface active agents can be used alone or in the form of a mixture of two or more thereof.

As the polymerization initiator, ordinary inorganic initiators such as persulfates and organic initiators such as organic peroxides and azo compounds are used alone or in combination with sulfites, hydrogensulfites, thiosulfates, primary metal salts and sodium formaldehydesulfoxylate as the redox initiator. Sodium persulfate, potassium persulfate and ammonium persulfate can be mentioned as the persulfate to be preferably used as the initiator, and tert.-butyl hydroperoxide, cumene hydroperoxide, benzoyl peroxide and lauroyl peroxide and preferably used as the organic peroxide.

A chain transfer agent can be used for adjusting the molecular weight of the polymer, and an alkylmercaptan having 5 to 20 carbon atoms can be used as the chain transfer agent.

The polymerization is carried out at a temperature higher than the decomposition temperature of the initiator under usual emulsion polymerization conditions. At the polymerization of each stage, all of each monomer or the monomer mixture can be added at a time, or all or a part of each monomer or the monomer mixture continuously added. In view of the polymerization stability and the removal of the polymerization reaction heat, the polymerization is preferably carried out while adding all or a part of each monomer or the monomer mixture.

The obtained latex of the graft copolymer (A) is usually coagulated by salting-out or acid precipitation, and the solid is recovered by filtration and washed with water to recover a powder. Alternatively, a powder can be recovered by spray drying or freeze drying.

According to the present invention, a thermoplastic resin composition having a good impact resistance can be obtained by incorporating 2 to 50 parts by weight of the thus-obtained impact resistance improver in 100 parts by weight of a thermoplastic resin.

When carrying out the present invention, the graft copolymer (A) and the thermoplastic resin are preferably mixed in the powdery state by using a ribbon blender or a Henschel mixer, and the mixture is molded and processed by a known mixing means such as a mixing roll or a Banbury mixer, a kneader, an extruder and an injection molding machine.

Known additives such as a stabilizer, a plasticizer, a lubricant, an ultraviolet absorber, a peeling agent, a release agent, a colorant and a flame retardant can be added to the thermoplastic resin composition of the present invention according to need.

The present invention will now be described in detail with reference to the following examples that by no means limit the scope of the invention.

In the examples, all of "parts" and "%" and by weight.

EXAMPLE 1

(Example B of Present Invention)

(1) Synthesis of Butadiene Polymer (A-1) Latex

A mixture comprising 100 parts of 1,3-butadiene, 4 parts of sodium laurate, 0.5 part of n-laurylmercaptan, 0.4 part of potassium persulfate and 180 parts of deionized water was charged in an autoclave, the inner atmosphere of which was replaced by nitrogen, and the polymerization was carried out with stirring at 60° C. for 50 hours to obtain a rubber latex having an average particle diameter of 0.09 μm.

(2) Synthesis of Polymer Latex (B) for Agglomeration

| | |
|---|---|
| Ethyl acrylate | 85 parts |
| Methacrylic acid | 15 parts |
| Potassium persulfate | 0.5 part |
| Nonsal TK-1 (semi-hardened beef tallow potassium soap supplied by Nippon Oil and Fats Co.) | 2.0 parts |
| Labisol 80 (sodium octylsulfosuccinate supplied by Nippon oil and Fats Co.) | 1.0 part |
| Water | 200 parts |

The polymerization was carried out at 70° C. for hours according to the above-mentioned recipe to obtain an emulsion latex having a pH value of 6.2.

(3) Synthesis of Agglomerated Latex (A-2)

A reaction vessel equipped with a stirrer was charged with 100 parts (as solids) of the abovementioned latex (A-1), and 2.0 parts (as solids) of the above-mentioned latex (B) was added with stirring over a period of 10 seconds to obtain an agglomerated latex (A-2). The average particle diameter of the agglomerated latex was 0.4 μm.

(4) Preparation of Mixed Rubber Latex (A-3)

The small-particle-size rubber latex (A-1) and large-particle-size rubber latex (A-2) obtained at the above-mentioned steps (1) and (3) respectively, were homogeneously mixed at room temperature at a mixing weight ratio of 10/90 to obtain a mixed rubber latex (A-3).

The weight average particle diameter of the mixed rubber latex (A-3) was measured by the light scattering method using Dynamic Light Scattering Photometer DLS-700 supplied by Otsuka Denshi K.K. Furthermore, the rubber latex was treated with an aqueous solution of osmium tetroxide and the respective particle diameters were measured from a transmission electron microscope (JEM-100S supplied by JEOL Ltd.) photograph. It was confirmed that the weight average particle diameters measured by these methods were properly in agreement with each other. The measurement results obtained according to the light scattering method are shown in column "Example B of Present Invention" in Table 1.

(5) Synthesis of Graft Copolymer (G-1)

A reaction vessel was charged with 70 parts (as solids) of the mixed rubber latex (A-3) obtained at the above-mentioned step (4) and 0.15 part of Rongalit as a reducing agent, and while the inner temperature was maintained at 70° C., a mixed liquid of 15 parts of methyl methacrylate to which 0.06 part of cumene hydroperoxide (hereinafter referred to as "CHP") was added was continuously dropped into the latex over a period of 1 hour and the mixture was maintained in this state for 1 hour. Then, at the second stage, a mixture of 3 parts of styrene and 0.02 part of CHP was continuously dropped over a period of 1 hour and the mixture was maintained in this state for 2 hours. Then, at the third stage, a liquid mixture comprising 12 parts of methyl methacrylate and 0.04 part of CHP was dropped over a period of 10 minutes and the mixture was maintained in this state for 1 hour to complete the polymerization.

Then 1.0 part of B.H.T. (2,6-di-tert.-butyl-p-cresol) was added as the heat stabilizer to the obtained latex, and the latex was coagulated by a 0.2% aqueous solution of sulfuric acid, and the solid was washed with warm water and dried to obtain a graft copolymer G-1).

(6) Preparation of Polyester Resin Composition

Polybutylene terephthalate (Tufpet PBT N-1000 supplied by Mitsubishi Rayon Co.) and the graft copolymer (G-1) were thoroughly mixed at a weight ratio of 80/20 by using a mixer, and the mixture was melt-kneaded at 240° C. and pelletized by using a vented twin-screw extruder having a diameter of 30 mm. The pellet was vacuum-dried and injection-molded at a resin temperature of 250° C. Then, to uniform the crystallinity, the molded body was heat-treated at 150° C. for 3 hours, and the impact resistance of the obtained molded article at normal temperature (23° C.) was evaluated. The results are shown in Table 1.

The notched Izod impact strength was measured as the impact resistance according to ASTM D-256.

EXAMPLE 2

(Examples A, C and D of Present Invention)

The procedures of Example 1 were repeated in the same manner except that the mixing ratio between the small-particle-size rubber latex (A-1) and the large-particle-size rubber latex (A-2) at the step (4) was changed as shown in Table 1.

The results are shown in columns "Examples A, C and D of Present Invention" in Table 1.

COMPARATIVE EXAMPLES A, B, C AND D

The procedures of Example 1 were repeated in the same manner except that the mixing ratio between the small-particle-size rubber latex (A-1) and the large-particle-size rubber latex (A-2) at the step (4) was changed as shown in Table 1, and in Comparative Example D, polybutylene terephthalate alone was used. The results are shown in columns "Comparative Examples A, B, C and D" in Table 1.

TABLE 1

|  | Examples of Present Invention | | | | Comparative Examples | | | |
|---|---|---|---|---|---|---|---|---|
|  | A | B | C | D | A | B | C | D*1 |
| Weight ratio of A-1 (%) | 0 | 10 | 20 | 30 | 50 | 80 | 100 | 20 |
| Weight ratio of A-2 (%) | 100 | 90 | 80 | 70 | 50 | 20 | 0 | 0 |
| Weight ratio of rubber particles having diameter of at least 0.3 μm (%)*2 | 92 | 85 | 73 | 68 | 40 | 15 | 0 | No rubber component |
| Izod impact strength (⅛ inch, notched) (kg · cm/cm) | 85 | 83 | 78 | 68 | 28 | 15 | 12 | 2 |

Note
*1 In Comparative Example D, polybutylene terephthalate alone was used.
*2 Determined by light scattering method

EXAMPLE 3

(Examples E, F and G of Present Invention)

The procedures of Example 1 were repeated in the same manner except that the amount as solids of the mixed rubber latex (A-3) obtained at the step (4) of Example 1 was changed as shown in Table 2, and the grafting recipe at the step (5) of Example 1 was correspondingly changed.

With respect to each of the obtained thermoplastic resin compositions, the impact resistance at normal temperature (23° C.) was measured. The results are shown in columns "Examples E, F and G of Present Invention" in Table 2.

COMPARATIVE EXAMPLES E AND F

The procedures of Example 3 were repeated in the same manner except that the amount as solids of the mixed rubber latex was changed as shown in Table 2. With respect to each of the obtained thermoplastic resin compositions, the impact strength at normal temperature (23° C.) was measured. The results are shown in columns "Comparative Examples E and F" in Table 2.

TABLE 2

|  | Examples of Present Invention | | | Comparative Examples | |
|---|---|---|---|---|---|
|  | E | F | G | E | F |
| Amount as solids of rubber | 60 | 80 | 90 | 50 | 95 |
| Izod impact strength (⅛ inch, notched) (kg · cm/cm) | 42 | 85 | 68 | 8 | 8 |

EXAMPLE 4

(Examples H through K of Present Invention)

The procedures of Example 1 were repeated in the same manner except that the amounts (Parts by weight) of the monomers graft-polymerized at the step (5) of Example 1 were changed as shown in Table 3, and the amount of the polymerization assistant used, dropping time and retention time were correspondingly changed.

With respect to each of the obtained thermoplastic resin compositions, the impact strength at normal temperature (23° C.) was measured. The results are shown in columns "Examples H through K of Present Invention" in Table 3.

COMPARATIVE EXAMPLES G THROUGH I

The procedures of Example 4 were repeated in the same manner except that the amounts (parts by weight) of the monomers to be graft-polymerized were changed as shown in Table 3.

With respect to each of the obtained thermoplastic resin compositions, the impact strength at normal temperature (23° C.) was measured. The results are shown in columns "Comparative Examples G through I" in Table 3.

TABLE 3

|  | Example of Present Invention | | | | Comparative Example | | |
|---|---|---|---|---|---|---|---|
|  | H | I | J | K | G | H | I |
| Methyl methacrylate (parts), first stage | 18 | 13 | 8 | 3 | 0 | 6 | 0 |
| Styrene (parts), second stage | 0 | 5 | 10 | 15 | 18 | 18 | 30 |
| Methyl methacrylate (parts), third stage | 12 | 12 | 12 | 12 | 12 | 6 | 0 |
| Izod impact strength (⅛ inch, notched) (kg · cm/cm) | 80 | 70 | 65 | 48 | 20 | 18 | 8 |

EXAMPLE 5

(Examples L through O of Present Invention)

(1) Preparation of Butadiene/Styrene Copolymer (A-4) Latex

| 1,3-Butadiene | 75 parts |
|---|---|
| Styrene | 25 parts |
| Divinylbenzene | 1 part |
| Diisopropyl benzene hydroperoxide | 0.2 part |
| Sodium pyrophosphate | 0.5 part |
| Ferrous sulfate | 0.01 part |
| Dextrose | 1.0 part |
| Potassium oleate | 2.0 parts |
| Water | 200 parts |

The polymerization was carried out at 50° C. in pressure-resistant autoclave according to the abovementioned recipe. The polymerization was completed in 8 hours, and the average particle diameter of the obtained rubber was 0.08 μm.

(2) The obtained rubber latex (A-4) was agglomerated by using the agglomerating polymeric latex (B) prepared at the step (2) of Example 1, and an agglomerated latex (A-5) having an average particle diameter of 0.43 μm was prepared in the same manner as at the step (3) of Example 1. Then the procedures as described at the steps (4) through (6) of Example 1 were repeated.

The butadiene/styrene rubber latex (A-4) and agglomerated latex (A-5) were used at the weight ratios shown in Table 4. With respect to each of the obtained thermoplastic resin compositions, the impact strength at normal temperature (23° C.) was measured. The results are shown in columns "Examples L through O of Present Invention" in Table 4.

COMPARATIVE EXAMPLES J THROUGH L

The procedures of Example 5 were repeated in the same manner except that the weight ratios of the butadiene/styrene rubber latex (A-4) and agglomerated latex (A-5) were changed as shown in Table 4. With respect to each of the obtained thermoplastic resin compositions, the impact strength at normal temperature (23° C.) was measured. The results are shown in columns "Comparative Examples J through L" in Table 4.

TABLE 4

|  | Examples of Present Invention | | | | Comparative Examples | | |
|---|---|---|---|---|---|---|---|
|  | L | M | N | O | J | K | L |
| Weight ratio of A-4 (%) | 0 | 10 | 20 | 30 | 50 | 80 | 100 |
| Weight ratio of A-5 (%) | 100 | 90 | 80 | 70 | 50 | 20 | 0 |
| Weight ratio of rubber particles having diameter of at least 0.3 μm measured by light scattering method | 94 | 86 | 75 | 68 | 43 | 18 | 0 |
| Izod impact strength (⅛ inch, notched) (kg · cm/cm) | 71 | 68 | 69 | 50 | 21 | 10 | 8 |

EXAMPLE 6

(Example Q of Present Invention)

Preparation of Polycarbonate/Polyester Resin Composition

A polycarbonate (Novalex 7022PJ supplied by Mitsubishi Kasei Corp.), polybutylene terephthalate and the graft copolymer (G-1) obtained at the step (5) of Example 1 were mixed at a weight ratio of 25/65/10, and the mixture was melt-kneaded at 260° C. and pelletized by using a vented twin-screw extruder having a diameter of 30 mm. The obtained pellet was injection-molded at 260° C. and heat-treated in the same manner as at the step (6) of Example 1. The impact resistance at normal temperature (23° C.) of the molded article was evaluated. The results are shown in column "Example Q of Present Invention" in Table 5.

EXAMPLE 7

(Examples P, R and S of Present Invention)

The procedures of Example 6 were repeated in the same manner except that the amount as solids of the mixed rubber latex (A-3) obtained at the step (4) of Example 1 was changed as shown in Table 5, and the grafting recipe at the step (5) of Example 1 was correspondingly changed.

With respect to each of the obtained thermoplastic resin compositions, the impact resistance at normal temperature (23° C.) was measured. The results are shown in columns "Examples P, R and S of Present Invention" in Table 5.

COMPARATIVE EXAMPLES M AND N

The procedures of Example 7 were repeated in the same manner except that the amount as solids of the mixed rubber latex was changed as shown in Table 5.

With respect to each of the obtained thermoplastic resin compositions, the impact resistance at normal temperature (23° C.) was measured. The results are shown in Table 5.

TABLE 5

|  | Examples of Present Invention | | | | Comparative Examples | |
|---|---|---|---|---|---|---|
|  | P | Q | R | S | M | H |
| Amount as solids of rubber (%) | 60 | 70 | 80 | 90 | 50 | 95 |
| Izod impact strength (⅛ inch, notched) (kg · cm/cm) | 65 | 78 | 82 | 68 | 15 | 5 |

EXAMPLE 8

(Example U of Present Invention)

Preparation of Polycarbonate Resin Composition

A polycarbonate (Novalex 7022PJ supplied by Mitsubishi Kasei Corp.) and the graft copolymer (G-1) obtained at the step (5) of Example 1 were mixed at a weight ratio of 90/10, and the mixture was melt-kneaded at 270° C. and pelletized by using a vented twin-screw extruder having a diameter of 30 mm. The obtained pellet was injection-molded at 270° C. in the same manner as at the step (6) of Example 1. The impact resistance of the molded article at a temperature of −30° C. was evaluated. The results are shown in column "Example U of Present Invention" in Table 6.

EXAMPLE 9

(Examples T, V and W of Present Invention)

The procedures of Example 8 were repeated in the same manner except that the amount as solids of the mixed rubber latex (A-3) obtained at the step (4) of Example 1 was changed as shown in Table 6, and the grafting recipe at the step (5) of Example 1 was correspondingly changed.

With respect to each of the obtained thermoplastic resin compositions, the impact resistance at a temperature of −30° C. was measured. The results are shown in columns "Examples T, V and W of Present Invention" in Table 6.

COMPARATIVE EXAMPLES O AND P

The procedures of Example 9 were repeated in the same manner except that the amount as solids of the mixed rubber latex was changed as shown in Table 6.

With respect to each of the obtained thermoplastic resin compositions, the impact resistance at a temperature of −30° C. was measured. The results are shown in Table 6.

TABLE 6

|  | Examples of Present Invention | | | | Comparative Examples | |
|---|---|---|---|---|---|---|
|  | T | U | V | W | O | P |
| Amount as solids of rubber (%) | 60 | 70 | 80 | 90 | 50 | 95 |
| Izod impact strength (⅛ inch, notched) | 54 | 54 | 60 | 53 | 43 | 40 |

TABLE 6-continued

| | Examples of Present Invention | | | | Comparative Examples | |
|---|---|---|---|---|---|---|
| | T | U | V | W | O | P |
| (kg · cm/cm) | | | | | | |

According to the present invention, when preparing an MBS resin as an impact resistance improver for a thermoplastic resin by emulsion polymerization, a diene type rubber latex comprising more than 50% by weight of a diene type rubber polymer having a weight average particle diameter of at least 0.3 μm as the rubber component of the MBS resin is used in an amount of 60 to 90% by weight (as solids), and the obtained MBS resin has a remarkable effect of improving the impact resistance of a thermoplastic resin.

We claim:

1. A thermoplastic resin composition comprising 100 parts by weight of a thermoplastic saturated polyester resin selected from the group consisting of polyethylene terephthalate, polytetramethylene terephthalate, and copolyesters based on these terephthalates polymers and containing a small amount of copolymerized 1,3-propanediol or isophthalic acid units and 2 to 50 parts by weight of a graft copolymer (A) obtained by emulsion-graft-polymerizing a monomer mixture comprised of a major amount of an acrylic monomer and a minor amount of at least one monomer selected from the group consisting of aromatic vinyl monomers and vinyl cyanide monomers in the presence of 60 to 90 % by weight as solids, based on the weight of the graft copolymer (A), of a diene rubber latex containing more than 50% by weight of a diene rubber polymer having a weight average particle diameter of at least 0.3 μm.

2. A thermoplastic resin composition according to claim 1, wherein the diene rubber latex contains at least 70% by weight of a diene type rubber polymer having a weight average particle diameter of at least 0.3 μm.

3. A thermoplastic resin composition according to claim 1, wherein the diene rubber polymer having a weight average particle diameter of at least 0.3 μm is prepared by agglomerating a rubber latex having a weight average particle diameter of smaller than 0.3 μm prepared by emulsion polymerization, said agglomeration being effected by incorporating a polymer latex having carboxylic acid units in the rubber latex having a weight average particle diameter of smaller than 0.3 μm.

4. A thermoplastic resin composition according to claim 1, wherein the diene rubber polymer is selected from the group consisting of polybutadiene, a butadiene/styrene copolymer, a butadiene/acrylonitrile copolymer and a butadiene/butyl acrylate copolymer.

5. A thermoplastic resin composition according to claim 1, wherein the acrylic monomer is selected from the group consisting of alkyl methacrylates having 1 to 4 carbon atoms in the alkyl group and alkyl acrylates having 1 to 4 carbon atoms in the alkyl group, the aromatic vinyl monomer is selected from the group consisting of styrene, α-methylstyrene, chlorostyrene and vinyltoluene; and the vinyl cyanide monomer is selected from the group consisting of acrylonitrile and methacrylonitrile.

6. A thermoplastic resin composition according to claim 1, wherein the monomer mixture to be graft-polymerized in the presence of the diene rubber latex is comprised of at least 65% by weight of an acrylic monomer and up to 35% by weight of the monomer selected from the group consisting of aromatic vinyl monomers and vinyl cyanide monomers.

7. A thermoplastic resin composition according to claim 1, wherein the amount of the diene rubber latex is 70 to 90% by weight as solids and based on the weight of the graft copolymer (A).

* * * * *